United States Patent [19]

Dohnalik

[11] Patent Number: 5,188,248
[45] Date of Patent: Feb. 23, 1993

[54] STABILIZING CYLINDER FOR A ROUGH TERRAIN FORKLIFT

[75] Inventor: Martin F. Dohnalik, Yankton, S. Dak.

[73] Assignee: Gehl Company, West Bend, Wis.

[21] Appl. No.: 516,334

[22] Filed: Apr. 27, 1990

[51] Int. Cl.⁵ .......................................... B66C 22/88
[52] U.S. Cl. .................................. 212/189; 280/714
[58] Field of Search ............... 280/714, 6.12, 112.2; 212/189

[56] References Cited

U.S. PATENT DOCUMENTS

| | | |
|---|---|---|
| 3,480,098 | 11/1969 | Ward, Jr. . |
| 3,572,746 | 3/1971 | Mueller . |
| 3,687,227 | 8/1972 | Reuter et al. . |
| 3,976,156 | 8/1976 | Maurer et al. . |
| 4,018,296 | 4/1977 | Knudson . |
| 4,053,171 | 10/1977 | Hyler . |
| 4,152,004 | 5/1979 | Schroder . |
| 4,236,591 | 12/1980 | Molby . |
| 4,264,014 | 4/1981 | Hogg . |
| 4,344,497 | 8/1982 | Rathi et al. . |
| 4,382,604 | 5/1983 | Nakagawa . |
| 4,393,959 | 7/1983 | Acker ................................ 280/714 |
| 4,580,797 | 4/1986 | Ericsson . |
| 4,669,566 | 6/1987 | Bergius et al. . |

FOREIGN PATENT DOCUMENTS

| | | | |
|---|---|---|---|
| 962195 | 4/1957 | Fed. Rep. of Germany ...... | 212/189 |
| 1090674 | 11/1967 | United Kingdom ................ | 212/189 |

Primary Examiner—Karin L. Tyson
Attorney, Agent, or Firm—Andrus, Sceales, Starke & Sawall

[57] ABSTRACT

A stabilizing device for use with a vehicle such as a rough terrain forklift. The stabilizing device employs a cylinder with a movable piston mounted therein, with upper and lower piston rods extending from the piston. The cylinder is fixed to the frame of the vehicle, and an end of the lower piston rod is fixed to the rear axle of the vehicle, which is pivotably mounted to the underside of the frame. A fluid communication system including restrictive orifices provides communication between upper and lower chambers of the cylinder so that, during upward or downward movement of the piston within the cylinder, fluid is forced to pass through the restrictive orifices to provide damping of oscillations, and thereby a firmer feel and more stable handling to the vehicle. A valve is movable to varying positions in response to the position of the boom relative to the frame, so that a more restrictive orifice is employed when the boom is moved above a predetermined angle, to increase the stability of the vehicle. When a larger predetermined angle is attained, the valve is moved to a lock-out position to prevent fluid communication between the cylinder chambers, providing a four-point stability stance to the vehicle. Alternatively, the valve can be moved to its lock-out position by operation of a manual toggle switch by the operator.

14 Claims, 2 Drawing Sheets

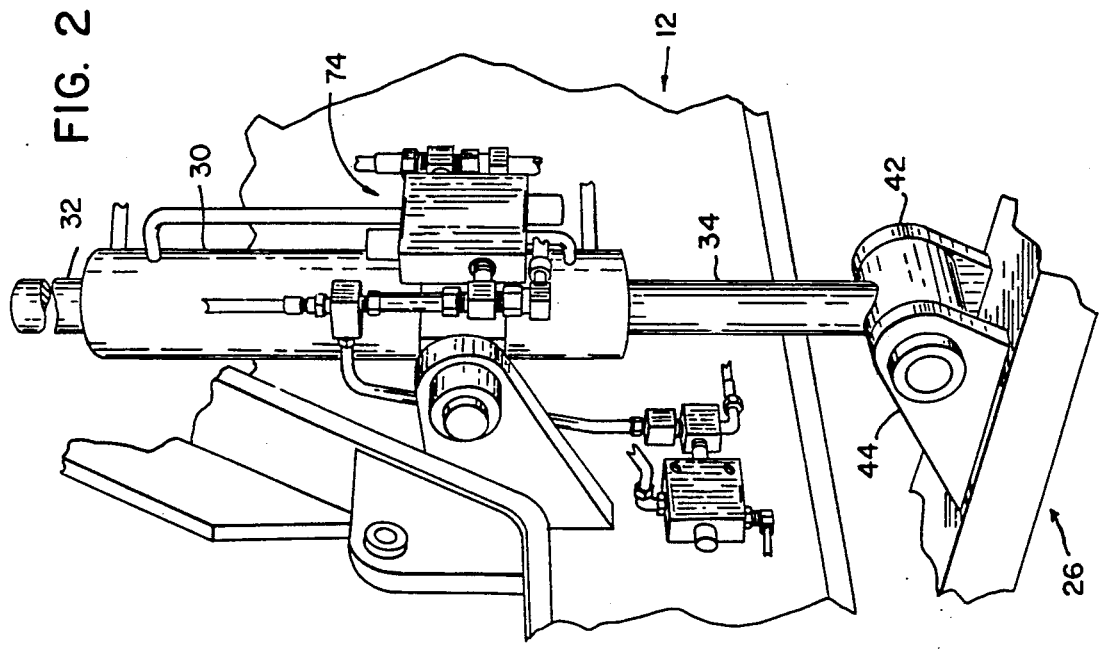
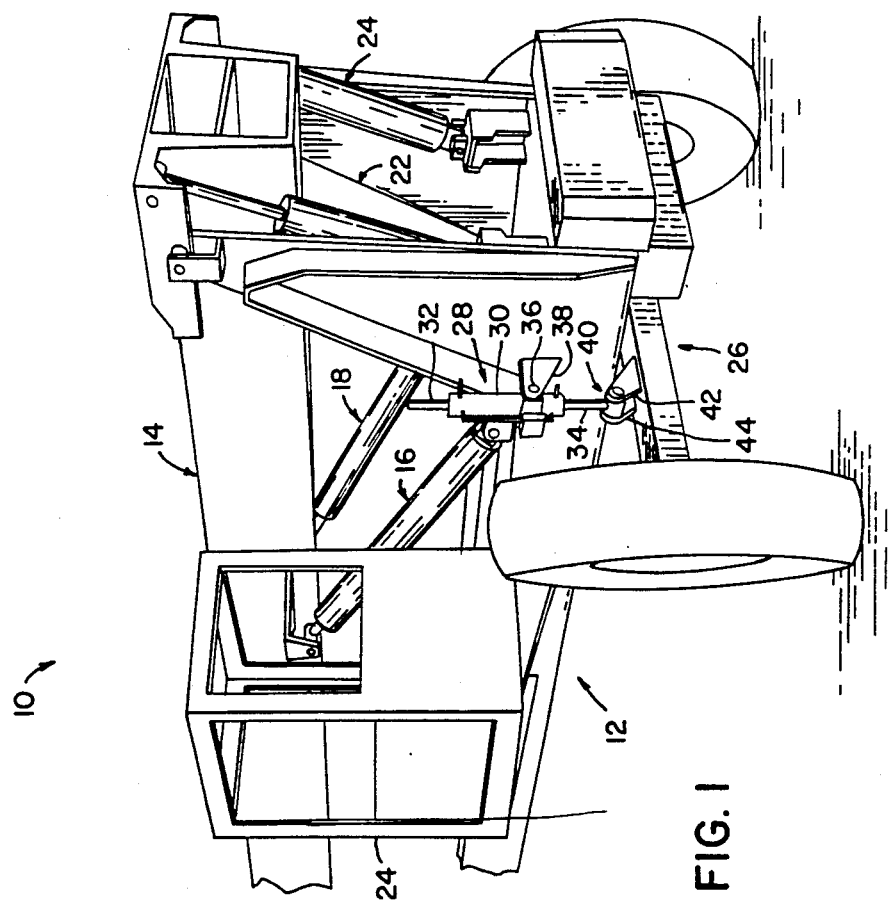

STABILIZING CYLINDER FOR A ROUGH TERRAIN FORKLIFT

BACKGROUND AND SUMMARY

This invention relates to a vehicle such as a rough terrain forklift, and more particularly to a stabilizing system for the suspension of a rough terrain forklift.

A rough terrain forklift typically has a three-point stance which includes the two front tires and a fulcrum or pivot point provided by a pin-type pivoting connection between the rear of the vehicle frame and the rear axle. This arrangement allows oscillation between the rear axle and the frame during movement of the vehicle over rough terrain. With such an arrangement, it is desirable to provide a system which improves the driving feel of the machine, and which also enhances the stability of the machine beyond industry requirements.

Accordingly, it is an object of the invention to provide a device which improves the handling and feel of a machine such as a rough terrain forklift during operation over rough terrain. It is a further object of the invention to provide a stabilizing system capable of providing varying degrees of damping of oscillation between the vehicle frame and the rear axle. It is yet another object of the invention to vary the degree of damping provided by the stabilizing system in response to an operating condition of the vehicle, such as the position of the forklift boom, relative to the frame.

In accordance with one aspect of the invention, a rough terrain forklift or the like is provided with a frame, a movable member mounted to the frame, and an axle assembly having a pair of wheels for supporting the frame above the ground, with the axle assembly being pivotably mounted to the frame. Damping means is interposed between the axle assembly and the frame for damping oscillation therebetween, with the damping means including means for varying the degree of damping provided thereby in response to the position of the movable member relative to the frame. The movable member may comprise a boom mounted for movement in a substantially vertical plane relative to the frame. The damping means preferably comprises a cylinder; a piston mounted for reciprocating movement within the cylinder, with the cylinder and the piston being connected one to the frame and the other to the axle assembly; and means for providing fluid communication between an area on one side of the piston and an area on the other side of the piston to allow fluid flow therebetween in response to movement of the piston within the cylinder. Variable restricting means as associated with the fluid communication means for restricting the flow of fluid from one side of the piston to the other. The variable restricting means is responsive to the position of the boom relative to the frame for varying the restriction of fluid flow provided thereby. The variable restricting means preferably comprises two or more restricting orifices associated with the fluid communication means, and valve means responsive to the position of the boom for routing fluid through a selected one of the restricting orifices. In one embodiment, the valve means is movable in response to angle-sensitive limit switches mounted to the boom, which selectively move the valve means to one position or another depending on the boom angle for routing fluid through a desired restricting orifice.

The invention also contemplates a method of varying the degree of damping provided by a stabilizing assembly including a damping system, substantially in accordance with the foregoing description.

In accordance with another aspect of the invention, lockout means is provided for selectively incapacitating the damping means. The lockout means is preferably responsive to the position of the boom relative to the frame, for eliminating the effect of the stabilizing system described above and providing a rigid connection between the frame and the axle assembly. In the embodiment in which the stabilizing system employs a cylinder and a piston having a piston rod extending therefrom, the lockout means cuts off communication between the areas of the cylinder on either side of the piston, for preventing movement of the piston within the cylinder. When this occurs, a two-point connection of the rear axle to the frame is attained, thus preventing oscillation between the frame and the rear axle assembly.

BRIEF DESCRIPTION OF THE DRAWINGS

The drawings illustrate the best mode presently contemplated of carrying out the invention.

In the drawings:

FIG. 1 is a partial isometric view showing the rear end portion of a rough terrain forklift and its rear axle assembly, with the stabilizing device of the invention in place thereon;

FIG. 2 is an enlarged isometric view of a portion of FIG. 1 showing interposition of the stabilizing device of the invention between the vehicle frame and the rear axle.

DETAILED DESCRIPTION OF THE PREFERRED EMBODIMENT

Figure 3:
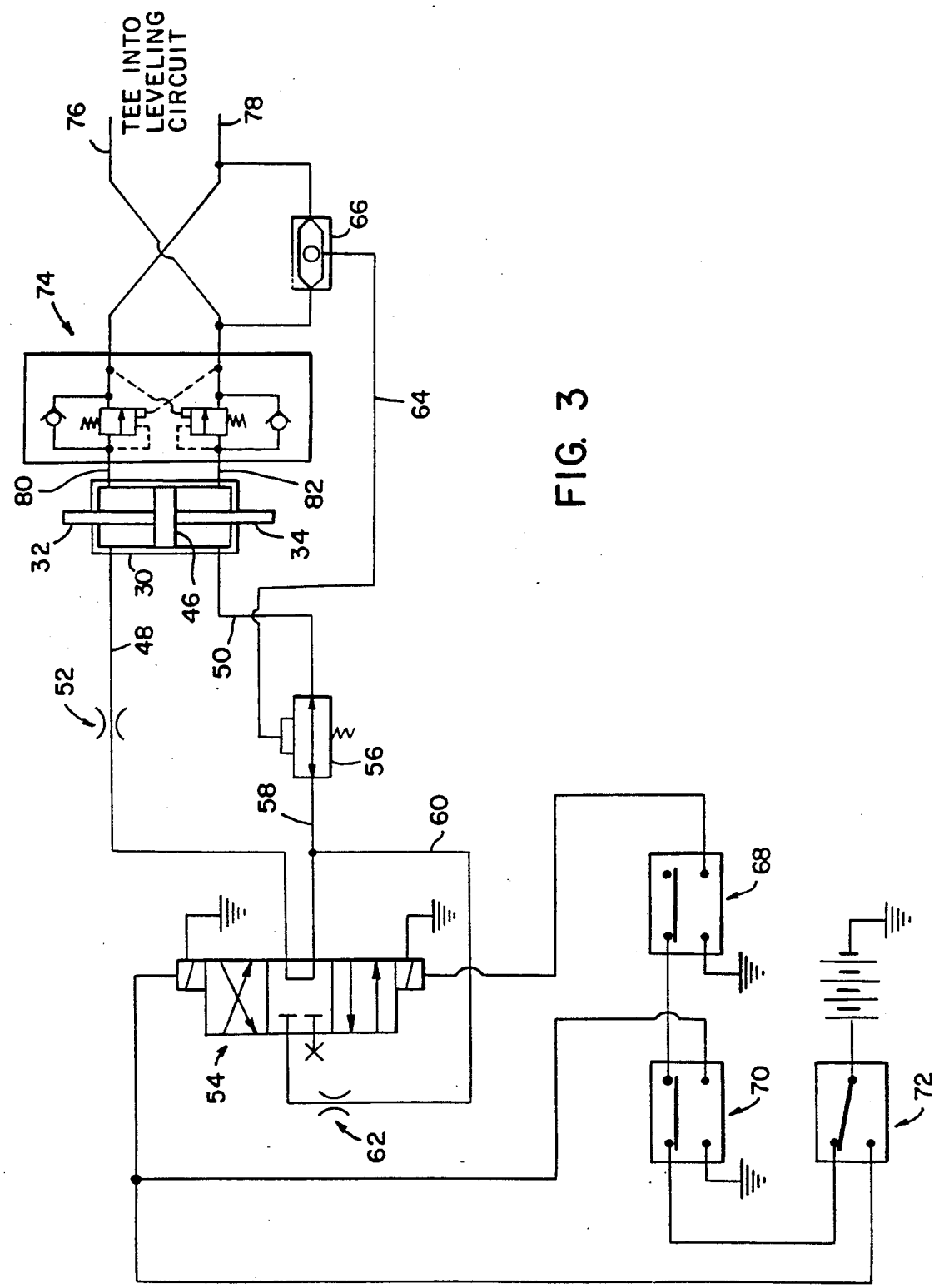
FIG. 3 is a schematic representation of the stabilizing device shown in FIGS. 1 and 2.

As shown in FIG. 1, a rough terrain forklift 10 generally includes a frame 12 to which a boom 14 is pivotably mounted toward an end thereof. A series of hydraulic cylinder assemblies, shown at 16, 18, 22 and 24, each including extendable and retractable rods, are interposed between frame 12 and boom 14 for providing upward and downward pivoting movement of boom 14 relative to frame 12 in a substantially vertical plane.

A front axle assembly (not shown) is rigidly secured at the front of frame 12, and a pair of front wheels are rotatably supported at the ends of the front axle assembly. A series of leveling cylinders (not shown) are also mounted to frame 12 for leveling frame 12 when forklift 10 is moved into a desired position on non-level ground.

An operator cab 24 is also mounted to frame 12, and the various controls for forklift 10 are located in cab 24.

A rear axle assembly 26 is mounted to the underside of frame 12 toward its rear end. Rear axle assembly 26 is mounted in a conventional manner as is known for rough terrain forklifts of the type illustrated, in which a pivotable pin-type connection is provided at the center of axle assembly 26 for allowing oscillation between frame 12 and rear axle assembly 26 during movement of vehicle 10 over rough ground. The pin-type connection between rear axle assembly 26, in combination with the front tires to which frame 12 is rigidly mounted, comprises a three-point stance for forklift 10.

A stabilizing device, shown generally at 28, is interposed between rear axle assembly 26 and frame 12 for increasing the stability of forklift 10 during operation over rough terrain and for providing a firmer feel to the vehicle.

Referring to FIGS. 1 and 2, stabilizing device 28 generally includes a cylinder body 30 within which a piston is slidably mounted. An upper piston rod 32 is connected to and extends upwardly from the internal piston, and a lower piston rod 34 is connected to and extends downwardly from the internal piston. Cylinder 30 is pivotably mounted to the side of frame 12 by a trunnion-type mount including a pair of pins, one of which is shown at 36, mounted to a pair of brackets, one of which is shown at 38, extending outwardly from the side of frame 12. The lower end of lower piston rod 34 is connected to the upper surface of axle assembly 26 by means of a clevis or pin-type mount, shown at 40, and a pair of brackets 42, 44 fixed to axle assembly 26.

Reference is now made to FIG. 3, which schematically illustrates stabilizing device 28 and its internal components. In FIG. 3, the piston mounted for slidable movement within the interior of cylinder 30 is illustrated at 46. As shown, upper and lower piston rods 32, 34 are equal in diameter so that, when piston 46 is positioned at the midpoint of cylinder 30, upper and lower chambers having equal volumes are provided on either side of piston 46.

A line 48 is connected to the upper portion of cylinder 30 and is in communication with the interior chamber, and a line 50 is connected to the lower portion of cylinder 30 and is in communication with the lower interior chamber. Accordingly, lines 48, 50 are in communication with areas of the interior of cylinder 30 on either side of piston 46.

An orifice 52 is disposed in line 48, providing a flow passage of approximately 0.09 inches diameter. Line 48 is connected at its leftward end to a valve, shown generally at 54. Line 50 is connected at its leftward end to a pilot operated solenoid valve 56, which is positioned so as to provide a passage therethrough normally in line with the leftward end of line 50. A line 58 extends from solenoid valve 56, and is connected at its leftward end to valve 54. A line 60 tees into line 58, and an orifice 62 providing a flow passage having a diameter of approximately 0.06 inches is disposed in line 60. The end of line 60 opposite line 58 is connected to valve 54.

A line 64 extends between the side of solenoid valve 56 and a shuttle valve 66. As shown, solenoid valve 56 is spring biased to a normally in-line position. Provision of fluid pressure within line 64 from shuttle valve 66, in a manner to be explained, moves valve 56 to an out of line position in which fluid communication therethrough is cut off, for reasons to be explained.

Valve 54 is a three-position solenoid operated directional valve, and is normally in a position as illustrated in FIG. 3. In this position, upward movement of piston 46 within cylinder 30, caused by oscillation of rear axle assembly 26 relative to frame 12, results in fluid from the upper chamber of cylinder 30 passing through line 48 and restricting orifice 52 and valve 54, line 58, valve 56 and line 50 to the lower chamber of cylinder 30. The restriction in orifice 52 provides a dampening effect to cushion oscillation and provide a smoother ride and more firm feel to forklift 10. When the operator moves boom 14 relative to frame 12 above a predetermined angle, for example 45°, a normally open limit switch 68 is caused to move to its closed position, providing electrical energy to the lower solenoid of valve 54, moving valve 54 upwardly so that its lower block is in an operative position. When in this position, fluid flow between the upper and lower chambers of cylinder 30 is forced to pass through reduced diameter restricting orifice 62, which provides a further dampening effect during movement of vehicle 10 over a rough terrain. In this position, fluid is forced through both of restricting orifices 52 and 62. When the operator moves boom 14 above a second predetermined angle greater than the first, for example 60°, a normally open limit switch 70 is caused to move to its closed position, providing electrical energy to the upper solenoid of valve 54. Simultaneously, electrical energy to limit switch 68 is cut off, and limit switch 68 returns to its normally open position. The lower solenoid of valve 54 returns to its retracted position, and the electrical energy provided to the upper solenoid of valve 54 causes the upper solenoid to move valve 54 downwardly to its lowermost position, bringing the uppermost block of valve 54 into an operative position. In this position, fluid communication between the upper and lower chambers of cylinder 30 is cut off, and cylinder 30 in combination with lower piston rod 34 and piston 46 provide a four-point stance to vehicle 10 by preventing oscillation of rear axle assembly 26 relative to frame 12.

An operator-controlled toggle switch 72 is provided for allowing the operator to manually move valve 54 to its lock-out position as described above to provide a stable four-point stability stance to vehicle 10. This feature is desirable when vehicle 10 is being operated on relatively flat surfaces, preventing the operator from feeling the effects of minor bumps or other obstructions which would result in minor oscillations of axle assembly 26 relative to frame 12.

A counterbalance block 74 is positioned between a pair of leveling circuit lines 76, 78 and a pair of lines 80, 82 providing communication to the upper and lower chambers, respectively, of cylinder 30. Counterbalance block 74 acts to maintain fluid pressure within cylinder 30 at all times. Counterbalance block 74 includes a counterbalance assembly for each chamber of cylinder 30, insuring that the upper and lower chambers are always subjected to equal pressures. The counterbalance valve assemblies close at a predetermined pressure in leveling circuit lines 76, 78, for example 1,000 PSI, and open when pressures in the leveling circuit fall below such a threshhold level. In this manner, in the event one of the lines associated with stabilizing device 28 were to fail, the leveling circuit could still be employed due to the isolation provided between the leveling circuit and stabilizing device 28 by counterbalance block 74.

Whenever pressure is introduced into leveling circuit lines 76, 78, which occurs when forklift 10 is stationary, shuttle valve 66 acts to supply fluid pressure through line 64 to the side of solenoid valve 56, moving valve 56 to an out of line position and incapacitating stabilizing device 28. When the predetermined threshhold pressure of counterbalance block 74 is attained during leveling, the side of counterbalance blocks 74 exposed to such pressure is moved to its open position to allow fluid flow into the chamber of cylinder 30 in which it is in communication. This provides upward or downward movement of piston 46 within cylinder 30 to accommodate movement of forklift 10 experienced during leveling.

Referring to FIG. 2, the physical embodiment of counterbalance block 74 in position relative to cylinder 30 is illustrated.

Various alternatives and embodiments are contemplated as being within the scope of the following claims particularly pointing out and distinctly claiming the subject matter regarded as the invention.

I claim:

1. An apparatus, comprising:
   a frame;
   a boom pivotably mounted to said frame for pivoting vertical movement relative to said frame;
   an axle assembly having a pair of ground-engaging wheels rotatably mounted at its ends for supporting said frame above the ground, said axle assembly being pivotably mounted to said frame; and
   damping means interposed between said axle assembly and said frame for damping oscillation between said axle assembly and said frame, said damping means including means for varying the degree of damping provided thereby responsive to the vertical angle of said boom relative to said frame.

2. An apparatus, comprising:
   a frame;
   a movable member mounted to said frame;
   an axle assembly having a pair of ground-engaging wheels rotatably mounted at its ends for supporting said frame above the ground, said axle assembly being pivotable mounted to said frame; and
   damping means interposed between said axle assembly and said frame for damping oscillation between said axle assembly and said frame, wherein said damping means comprises a cylinder, a piston mounted for reciprocating movement within said cylinder, said cylinder and said piston being connected one to said frame and the other to said axle assembly, means for providing fluid communication between an area on one side of said piston and an area on the other side of said piston to allow fluid flow therebetween in response to movement of said piston within said cylinder, and variable restricting means associated with said fluid communication means for restricting the flow of fluid from one side of said piston to the other, said variable restricting means being responsive to the position of said movable member relative to said frame for varying the restriction of fluid flow provided thereby responsive to the position of said movable member relative to said frame.

3. The apparatus of claim 2, wherein said variable restricting means comprises two or more restricting orifices associated with said fluid communication means, and valve means responsive to the position of said movable member relative to said frame for routing fluid through a selected one of said restricting orifices.

4. An apparatus, comprising:
   a frame;
   a vertically movable member mounted to said frame;
   an axle assembly having a pair of ground-engaging wheels rotatably mounted at its ends for supporting said frame above the ground, said axle assembly being pivotably mounted to said frame; and
   a stabilizing assembly interposed between said frame and said axle assembly, comprising a cylinder; a piston mounted for reciprocating movement within said cylinder; a rod extending from said piston; said stabilizing assembly being arranged such that said cylinder and said piston rod are connected one to said frame and the other to said axle assembly; means for providing fluid communication between an area on one side of said piston and an area on the other side of said piston to allow fluid flow therebetween in response to movement of said piston within said cylinder; and variable restricting means associated with said fluid communication means for restricting the flow of fluid from one side of said piston to the other; said variable restricting means being responsive to the position of said vertically movable member for varying the restriction provided by said stabilizing assembly.

5. The apparatus of claim 4, wherein said variable restricting means comprises two or more restricting orifices associated with said fluid communication means, and valve means responsive to the position of said movable member relative to said frame for routing fluid through a selected one of said restricting orifices.

6. For an apparatus including a frame; a boom pivotably mounted to said frame for pivoting vertical movement relative to said frame; and an axle assembly having a pair of ground-engaging wheels rotatably mounted at its ends for supporting said frame above the ground; a method of damping oscillation between said axle assembly and said frame, comprising the steps of:
   positioning a damping assembly between said axle assembly and said frame; and
   varying the degree of damping provided by said damping assembly in response to the vertical position of said boom relative to said frame by sensing the vertical angle of the boom relative to the frame and varying the degree of damping in response thereto.

7. The method of claim 6, wherein the step of sensing the angle of the boom relative to the frame comprises mounting a plurality of angle-sensitive limit switches to the boom.

8. The method of claim 7, wherein the step of varying the degree of damping provided by the damping assembly comprises connecting a cylinder and piston rod one to the frame and the other to the axle assembly; providing fluid communication between areas of the cylinder on either side of a piston slidably mounted therewithin to which the piston rod is connected; and providing a variable restriction in fluid communication between areas of the cylinder on either side of the piston, and varying the restriction provided thereby in response to the position of the movable member relative to the frame, wherein the step of providing a variable restriction comprises providing two or more restrictions, and the step of varying the restriction comprises selectively placing one of the two or more restrictions into communication between areas of the cylinder on either side of the piston by selectively moving a valve into a desired position in response to the position of the movable member relative to the frame, with the valve being movable in response to the angle sensitive limit switches mounted to the boom.

9. For an apparatus including a frame; a movable member mounted to said frame; and an axle assembly having a pair of ground-engaging wheels rotatably mounted at its ends for supporting said frame above the ground; a method of damping oscillation between said axle assembly and said frame, comprising the steps of:
   positioning a damping assembly between said axle assembly and said frame; and
   varying the degree of damping provided by said damping assembly in response to the position of said movable member relative to said frame by connecting a cylinder and a piston rod one to the frame and the other to the axle assembly; providing fluid communication between areas of the cylinder on either side of a piston mounted therewithin to which the piston rod is connected; and providing a variable restriction in fluid communication between areas of the cylinder on either side of the piston, and varying the restriction provided thereby in response to the position of the movable member relative to the frame.

10. The method of claim 9, wherein the step of providing a variable restriction comprises providing two or more restrictions, and wherein the step of varying the restriction comprises selectively placing one of the two or more restrictions into communication between areas of the cylinder on either side of the piston.

11. The method of claim 10, wherein the step of selectively placing one of the two or more restrictions into communication between areas of the cylinder on either side of the piston comprises moving a valve into a desired position in response to the position of the movable member relative to the frame.

12. An apparatus, comprising:
a frame;
an axle assembly having a pair of ground-engaging wheels rotatably mounted at its ends for supporting said frame above the ground, said axle assembly being pivotably mounted to said frame;
damping means interposed between said axle assembly and said frame for damping oscillation between said axle assembly and said frame, comprising a cylinder, a piston mounted for reciprocating movement within said cylinder, said cylinder and said piston being connected one to said frame and the other to said axle assembly, means for providing fluid communication between an area on one side of said piston and an area on the other side of said piston to allow fluid flow therebetween in response to movement of said piston within said cylinder, and restricting means associated with said fluid communication means for restricting the flow of fluid from one side of the piston to the other; and
lockout mean for selectively incapacitating said damping means, comprising means for selectively preventing fluid flow within said fluid communication means from one side of said piston to the other, to fix the position of said piston relative to said cylinder thereby to provide a two-point connection between said axle assembly and said frame.

13. The apparatus of claim 12, further comprising a movable member movably mounted to said frame, and wherein said lockout means is responsive to the position of said movable member relative to the frame.

14. The apparatus of claim 12, wherein said lockout means comprises valve means movable to varying positions in response to the position of a movable member relative to the frame.

* * * * *